United States Patent Office 3,422,339
Patented Jan. 14, 1969

3,422,339
ALTERNATOR WITH A BUILT-IN FULL WAVE RECTIFIER
Alfred Dickens Baker, Solihull, England, assignor to Joseph Lucas (Industries) Limited, Birmingham, England, a British company
Filed July 25, 1966, Ser. No. 567,703
U.S. Cl. 321—8                                    1 Claim
Int. Cl. H02m 7/00; H02k 11/00

ABSTRACT OF THE DISCLOSURE

In an alternator with a built-in full wave rectifier, the rectifier consists of a plurality of diodes each having one face in facial contact with a printed circuit board which provides the output terminals from the alternator. The other face of the diode is in contact with a flexible conductor connected to a phase winding of the alternator, and springs act between the casing of the alternator and the flexible conductors to urge the diodes into engagement with the printed circuit board. The springs take up movement of the flexible conductors, which in turn take up movement of the diodes owing to their expansion.

---

This invention relates to full wave rectifiers particularly for use in alternators to provide a D.C. output therefrom.

A full wave rectifier according to the invention comprises in combination a printed circuit board, a plurality of diodes mounted on the board, a plurality of flexible conductors providing the A.C. input to the diodes, and circuits printed on the board and providing the required connections between the diodes and terminals on the board so that a D.C. output appears at said terminals, any expansion of the diodes in use being taken up by the flexible conductors.

Figures 1, 2:
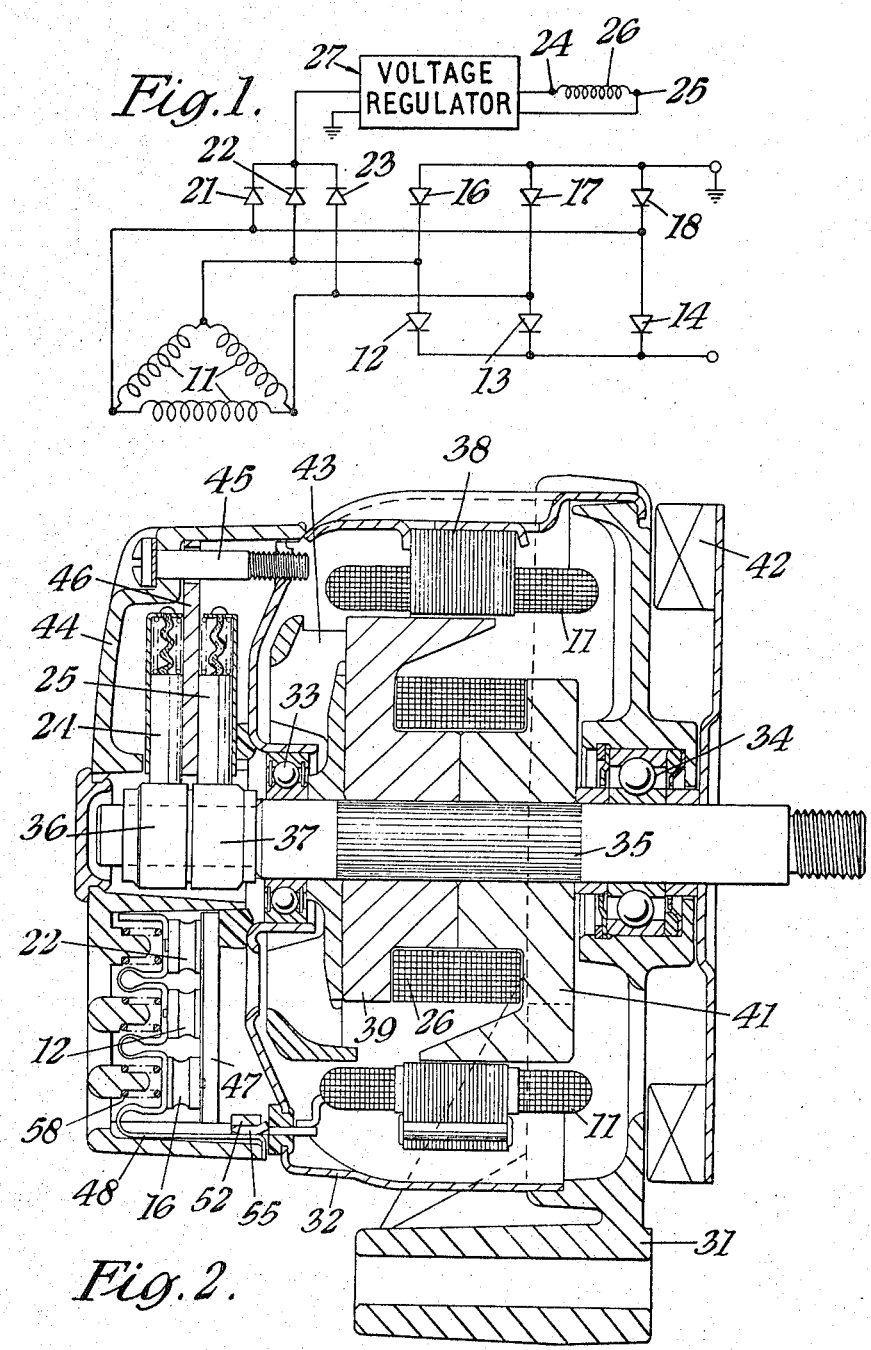
Figure 3:
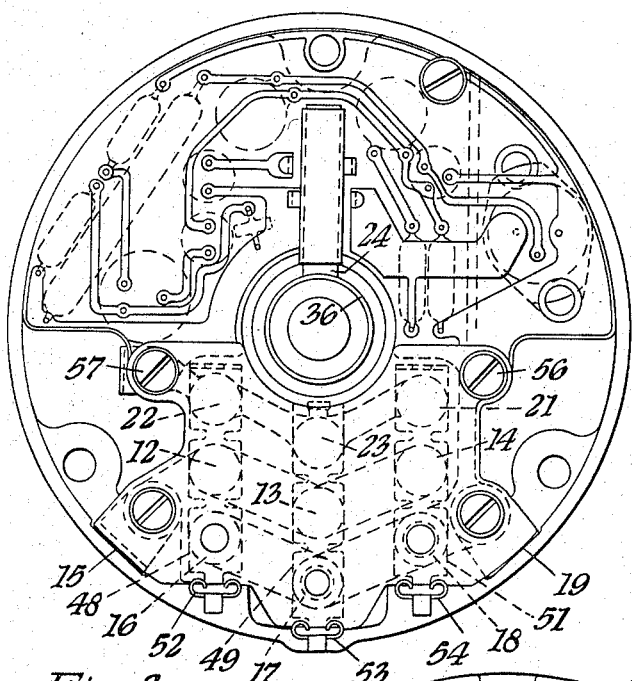
Figure 4:
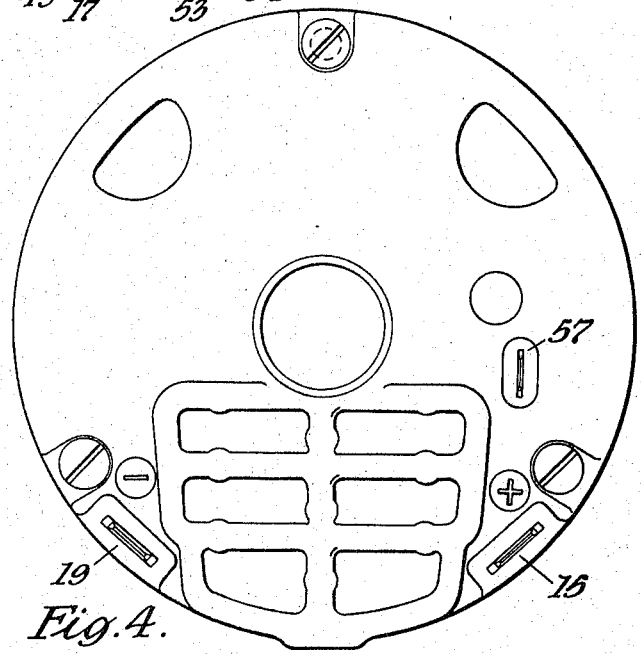

One example of the invention is illustrated in the accompanying drawings wherein:

FIGURE 1 is a circuit diagram of an alternator,
FIGURE 2 is a sectional side view of an alternator,
FIGURE 3 is a view inside the end cover of the alternator, and,
FIGURE 4 is an exterior view of the end cover.

Referring to FIGURE 1, the alternator includes three delta-connected stator windings 11, the phase points of which are connected respectively to the anodes of three diodes 12, 13, 14 having a common cathode connection to the live alternator output terminal 15, the phase points being further connected to the cathodes of three diodes 16, 17, 18 respectively the anodes of which have a common connection to the earthed alternator output terminal 19. The phase points are further connected to the anodes of diodes 21, 22, 23 the cathodes of which supply power through brushes 24, 25 and associated slip rings to the field winding 26 of the alternator, the current supplied to the field winding 26 being controlled by a voltage regulator 27. The details of the voltage regulator 27 are not important to an understanding of the present invention.

Referring now to FIGURES 2 to 4, the alternator comprises a casing consisting of an end bracket 31 through which the alternator is mounted in a vehicle, and a pressed shell 32 which is secured to the bracket 31. The casing supports a pair of bearings 33, 34 which support for rotation a shaft 35 which projects from opposite ends of the casing. The end of the shaft projecting from the bearing 34 is screw threaded and so adapted for connection to driving means operated by the engine of the vehicle with which the alternator is associated, and the end of the shaft projecting from the bearing 33 is formed with the pair of slip rings 36, 37.

The shell 32 carries the stator 38 on which the windings 11 are held, and mounted on the shaft 35 and having a splined connection therewith is an interdigitated rotor 39, 41 carrying the field winding 26. The winding 26 has its opposite ends connected to the slip rings 36, 37 by connecting leads (not shown).

The shaft 35 also carries two fans 42, 43. The fan 42 is mounted on the shaft adjacent the bearing 34, whilst the fan 43 is positioned between the bearing 33 and the part 39 of the rotor. The blades on the fan 43 are so positioned relative to the fingers on the part 39 of the rotor, that when the rotor and fan turn with the shaft 35, the fan 43 will cause air to flow around both sides of the stator windings 11. Thus, at positions such as the position illustrated in the lower half of FIGURE 2, the fan 43 will drive air towards the finger on the part 41, and this air will flow between the winding 11 and the winding 26 and then circumferentially around the winding 11 when the air reaches the finger seen on the part 41. However, in the position shown in the upper part of FIGURE 2, the finger on the part 39 prevents air from flowing between the rotor and the winding 11, and so the air flows between the winding 11 and the shell 32. In this way maximum cooling of the winding 11 is provided.

The alternator further includes an end cover 44 which is secured to the shell 32 by bolts 45 and is provided with holes through which air is drawn by the fans for cooling purposes. The cover 44 carries the voltage regulator 27, the nine diodes and their connections, and the brush box together with the brushes 24, 25 which act on the slip rings 36, 37 respectively. As can be seen from FIGURES 2 and 3 the voltage regulator 27 is carried by a printed circuit board on which is mounted two metal pressings accommodating the brushes or acting as brush guides. The diodes are located on a second printed circuit board 47, and inputs to the diode are made in the required manner by soldering the diodes to three flexible conductors 48, 49, 51. These conductors are shaped at one end to provide sockets 52, 53, 54 respectively, and as shown in FIGURE 2, the stator windings are welded to mating pins, one of which is shown at 55, which when the end cover is placed in position automatically engage the appropriate socket to make the required connections to the flexible conductors 48, 49, 51. The other connections of the diodes are made by engagement of the diodes with the circuits printed on the board 47 which are connected to the output terminals 15, 19 as seen in FIGURES 3 and 4. The board 47 also provides an output terminal 56 which is connected to the cathodes of the diodes 21, 22, 23 which is also connected to the printed circuit board 46 and provides the required connection to the voltage regulator, and a terminal 57 which is used to operate a warning light circuit (not shown in FIGURE 1).

Acting between the strips 48, 49, 51 and projections on the cover 44 are springs 58 shown in FIGURE 2. These springs 58 thereby urge the diodes into engagement with the circuits printed on the board 47. The springs 58 further provide a resilient mounting for the diodes, and the arrangement is such that any expansion of the diodes due to the heat generated in them is taken up by the appropriate flexible conductor in conjunction with one or more of the springs 58.

It will be noted in FIGURE 2 that the diodes are provided with small projections on one side of the diode so that the positive and negative sides of the diode can readily be identified. The printed circuit board 47 used consists of a conductive base with a layer of insulating material on the base, and the actual conductors on the insulating material. It will be appreciated that the flexible conductor 48 must be provided with holes to accept the projections on the diodes 12, 22, and that the board 47 must have a hole to accept the projection on the diode 16. Thus, the diode 16 is actually connected to the board 47 electrically, but this does not matter because it can be seen from FIGURE 1 that the diode 16 is an earthed diode.

Having thus described my invention what I claim as new and desire to secure by Letters Patent is:

1. An alternator comprising in combination a casing, a stator supported by the casing and carrying the phase windings of the alternator, a rotor mounted for rotation in said casing, a field winding carried by said rotor, slip rings carried by said shaft and rotatable therewith, brushes engaging said slip rings for providing current to said field winding, a printed circuit board carried by said casing, a pair of output terminals connected to said printed circuit board for providing a D.C. output from said alternator, a plurality of pairs of diodes, one pair for each phase of the alternator, each diode having one terminal thereof in facial contact with said printed circuit board so as to be electrically connected thereto, a plurality of flexible conductors connected to the phase windings of the alternator respectively, each flexible conductor being secured to the other terminals of the pair of diodes associated with the phase windings to which the flexible conductor is connected, and a plurality of springs acting between the casing and the flexible conductors to maintain the diodes in engagement with the printed circuit board, expansion of the diodes being taken up in use by said flexible conductors, and said springs serving to take up movement of the flexible conductors owing to heating of the diodes.

References Cited

UNITED STATES PATENTS

| 3,160,771 | 12/1964 | Martin et al. | 321—8 X |
| 3,250,928 | 5/1966 | Bates | 310—68 |
| 3,329,840 | 7/1967 | Binder | 310—68 |
| 3,329,841 | 7/1967 | Binder et al. | 321—8 X |

JOHN F. COUCH, *Primary Examiner.*

W. H. BEHA, JR., *Assistant Examiner.*

U.S. Cl. X.R.

310—68